(12) United States Patent
Miller

(10) Patent No.: US 10,592,596 B2
(45) Date of Patent: Mar. 17, 2020

(54) TECHNIQUES FOR PROVIDING A NARRATIVE SUMMARY FOR FANTASY GAMES

(75) Inventor: Louis E. Miller, Little Egg Harbour Township, NJ (US)

(73) Assignee: CBS Interactive Inc., New York, NY (US)

( * ) Notice: Subject to any disclaimer, the term of this patent is extended or adjusted under 35 U.S.C. 154(b) by 1129 days.

(21) Appl. No.: 13/338,395

(22) Filed: Dec. 28, 2011

(65) Prior Publication Data

US 2013/0173673 A1 Jul. 4, 2013

(51) Int. Cl.
*G06F 16/958* (2019.01)
*G06F 17/24* (2006.01)
*A63F 13/828* (2014.01)
*A63F 13/30* (2014.01)
*A63F 13/60* (2014.01)

(52) U.S. Cl.
CPC .............. *G06F 17/24* (2013.01); *A63F 13/30* (2014.09); *A63F 13/60* (2014.09); *A63F 13/828* (2014.09)

(58) Field of Classification Search
CPC ........... G06Q 30/0254; G06Q 30/0282; G06Q 30/0224; G06Q 50/01; G06Q 30/0255; G06Q 10/087; G06Q 30/0601; G06Q 30/0253; G06Q 30/0633; G06Q 30/0641; G06Q 10/06; Y10S 707/99931; Y10S 707/99934; Y10S 707/99939; G06F 17/248; G06F 17/27; G06F 17/2881; G06F 17/3089; G06F 9/451; G06F 9/454; A63F 13/12; A63F 13/00; A63F 2300/5533; A63F 2300/572; G07F 17/32; G07F 17/3223; G07F 17/3237; G07F 17/3239; G07F 17/3262
USPC ................ 707/779, 627, 688, 755–756, 793, 707/803–804, 811
See application file for complete search history.

(56) References Cited

U.S. PATENT DOCUMENTS

| 4,992,939 A | 2/1991 | Tyler |
| 5,043,891 A | 8/1991 | Goldstein et al. |
| 5,283,856 A * | 2/1994 | Gross ..................... G06N 5/022 706/47 |
| 5,731,991 A | 3/1998 | Kinra et al. |
| 5,802,495 A | 9/1998 | Goltra |

(Continued)

OTHER PUBLICATIONS

International Search Report, Application No. PCT/US2008/068916 dated Feb. 4, 2009.

(Continued)

*Primary Examiner* — Alex Gofman
*Assistant Examiner* — Linh Black

(57) ABSTRACT

Various embodiments for providing a narrative summary for fantasy games are described. Embodiments may include a summary engine executing on a logic device. The summary engine may select a beat writer and a story type. The summary writer may select new content from one or more databases of fantasy league data. The beat writer may affect what story type is selected. The summary engine may construct a master template according to the story type that has empty slots. The summary engine may fill the empty slots of the master template with data from the new content to generate a narrative summary, and publish the narrative template with the slots filled. Other embodiments are described and claimed.

14 Claims, 11 Drawing Sheets

(56) References Cited

U.S. PATENT DOCUMENTS

| | | | |
|---|---|---|---|
| 5,913,215 A | 6/1999 | Rubinstein et al. | |
| 5,963,919 A | 10/1999 | Brinkley et al. | |
| 5,963,939 A | 10/1999 | McCann et al. | |
| 6,034,652 A | 3/2000 | Freiberger et al. | |
| 6,236,990 B1 | 5/2001 | Geller et al. | |
| 6,263,507 B1 | 7/2001 | Ahmad et al. | |
| 6,544,040 B1 | 4/2003 | Brelis et al. | |
| 6,571,236 B1 | 5/2003 | Ruppelt | |
| 6,651,219 B1 | 11/2003 | Elliott | |
| 6,757,682 B1 | 6/2004 | Naimark et al. | |
| 6,788,314 B1 | 9/2004 | Freiberger et al. | |
| 6,976,031 B1 | 12/2005 | Toupal et al. | |
| 7,069,308 B2 | 6/2006 | Abrams | |
| 7,080,019 B1 | 7/2006 | Hurzeler | |
| 7,194,405 B2 | 3/2007 | Tavor | |
| 7,333,967 B1 | 2/2008 | Bringsjord et al. | |
| 7,418,447 B2 | 8/2008 | Caldwell et al. | |
| 7,472,110 B2 | 12/2008 | Achlioptas | |
| 7,530,018 B2 | 5/2009 | Bischoff | |
| 7,720,723 B2 | 5/2010 | Dicker et al. | |
| 7,783,528 B2 | 8/2010 | Musgrove et al. | |
| 7,809,601 B2 | 10/2010 | Shaya et al. | |
| 7,840,448 B2 | 11/2010 | Musgrove et al. | |
| 7,856,390 B2 | 12/2010 | Schiller | |
| 8,019,656 B2 | 9/2011 | Baran et al. | |
| 8,036,995 B2 * | 10/2011 | Van Doorn | G06N 5/02 706/11 |
| 8,355,903 B1 | 1/2013 | Birnbaum et al. | |
| 8,374,848 B1 | 2/2013 | Birnbaum et al. | |
| 8,515,737 B2 * | 8/2013 | Allen | 704/9 |
| 8,630,844 B1 | 1/2014 | Nichols et al. | |
| 9,342,507 B1 | 5/2016 | Kaeser | |
| 2001/0032077 A1 | 10/2001 | Tavor | |
| 2002/0044045 A1 | 4/2002 | Crookham et al. | |
| 2002/0055379 A1 | 5/2002 | Saidakovsky et al. | |
| 2002/0161664 A1 | 10/2002 | Shaya et al. | |
| 2002/0188556 A1 | 12/2002 | Colica et al. | |
| 2003/0061208 A1 | 3/2003 | Ohashi | |
| 2003/0105682 A1 | 6/2003 | Dicker et al. | |
| 2003/0135460 A1 | 7/2003 | Talegon | |
| 2003/0185368 A1 | 10/2003 | Bradfield et al. | |
| 2003/0212955 A1 | 11/2003 | Bischoff | |
| 2003/0229900 A1 * | 12/2003 | Reisman | G06F 17/30873 725/87 |
| 2004/0015415 A1 | 1/2004 | Cofino et al. | |
| 2004/0024656 A1 | 2/2004 | Coleman | |
| 2004/0091848 A1 | 5/2004 | Nemitz | |
| 2004/0148275 A1 | 7/2004 | Achlioptas | |
| 2004/0225651 A1 | 11/2004 | Musgrove et al. | |
| 2004/0253569 A1 | 12/2004 | Deane et al. | |
| 2005/0075940 A1 | 4/2005 | DeAngelis | |
| 2005/0159220 A1 * | 7/2005 | Wilson | A63F 13/12 463/40 |
| 2005/0198031 A1 | 9/2005 | Pezaris et al. | |
| 2006/0101335 A1 | 5/2006 | Pisciottano | |
| 2006/0135232 A1 * | 6/2006 | Willis | A63F 13/12 463/1 |
| 2006/0190392 A1 * | 8/2006 | Samid | G06Q 40/04 705/37 |
| 2006/0252476 A1 * | 11/2006 | Bahou | A63F 13/12 463/4 |
| 2006/0258419 A1 * | 11/2006 | Winkler et al. | 463/1 |
| 2007/0011367 A1 | 1/2007 | Scott et al. | |
| 2007/0132767 A1 | 6/2007 | Wright et al. | |
| 2007/0143119 A1 * | 6/2007 | Jung | G06Q 10/0635 705/4 |
| 2007/0198355 A1 | 8/2007 | Samson et al. | |
| 2007/0204211 A1 * | 8/2007 | Paxson | G06F 17/2229 715/205 |
| 2007/0207845 A1 * | 9/2007 | Gottlieb | A63F 13/12 463/9 |
| 2007/0225071 A1 * | 9/2007 | Van Luchene | A63F 13/35 463/29 |
| 2008/0086512 A1 | 4/2008 | Fahys | |
| 2008/0096664 A1 * | 4/2008 | Baray | A63F 13/12 463/42 |
| 2008/0161113 A1 * | 7/2008 | Hansen | A63F 13/12 463/42 |
| 2008/0207327 A1 * | 8/2008 | Van Luchene | A63F 13/12 463/42 |
| 2008/0215607 A1 * | 9/2008 | Kaushansky | G06F 17/30867 |
| 2008/0287198 A1 * | 11/2008 | Callery | G07F 17/3276 463/42 |
| 2008/0306925 A1 | 12/2008 | Campbell et al. | |
| 2009/0100409 A1 * | 4/2009 | Toneguzzo | G06Q 10/00 717/113 |
| 2009/0149248 A1 | 6/2009 | Busey et al. | |
| 2009/0187407 A1 | 7/2009 | Soble et al. | |
| 2009/0201318 A1 * | 8/2009 | Silverstein et al. | 345/690 |
| 2009/0253517 A1 * | 10/2009 | Bererton | A63F 13/12 463/42 |
| 2009/0259697 A1 | 10/2009 | Satou et al. | |
| 2009/0325685 A1 * | 12/2009 | Webb | A63F 13/12 463/25 |
| 2010/0197374 A1 * | 8/2010 | Koivisto | A63F 13/12 463/4 |
| 2010/0203970 A1 * | 8/2010 | Hope | G06F 16/4393 463/42 |
| 2010/0211431 A1 * | 8/2010 | Lutnick | G06Q 30/02 705/14.12 |
| 2010/0227685 A1 | 9/2010 | Mori | |
| 2010/0268776 A1 | 10/2010 | Gerke | |
| 2011/0029339 A1 * | 2/2011 | Callahan | G06Q 10/10 705/7.29 |
| 2011/0087486 A1 | 4/2011 | Schiller | |
| 2011/0099195 A1 | 4/2011 | Patwardhan et al. | |
| 2011/0165946 A1 * | 7/2011 | Pavlich | G07F 17/32 463/42 |
| 2011/0183731 A1 * | 7/2011 | Barry | A63F 13/85 463/1 |
| 2011/0237317 A1 * | 9/2011 | Noonan | A63F 13/85 463/2 |
| 2011/0258258 A1 | 10/2011 | Briere et al. | |
| 2011/0261071 A1 * | 10/2011 | Ganetakos | G06Q 10/00 345/619 |
| 2011/0311205 A1 | 12/2011 | McClanahan et al. | |
| 2012/0010979 A1 | 1/2012 | Ramer et al. | |
| 2012/0087637 A1 * | 4/2012 | Logan | H04H 20/28 386/241 |
| 2012/0142429 A1 * | 6/2012 | Muller | A63F 13/12 463/42 |
| 2012/0220375 A1 * | 8/2012 | Williams | A63F 13/828 463/42 |
| 2012/0283858 A1 * | 11/2012 | Lapadula | A63F 13/828 700/93 |
| 2013/0060361 A1 * | 3/2013 | Gabrail | G07F 17/32 700/91 |
| 2013/0173673 A1 | 7/2013 | Miller | |
| 2013/0174026 A1 | 7/2013 | Locke | |
| 2013/0262092 A1 | 10/2013 | Wasick | |
| 2014/0067702 A1 * | 3/2014 | Rathod | G06Q 10/10 705/319 |
| 2014/0087875 A1 | 3/2014 | Ham | |
| 2015/0352449 A1 * | 12/2015 | Nangia | A63F 13/828 463/31 |

OTHER PUBLICATIONS

EPO "Notice from the European Office dated Oct. 1, 2007 Concerning Business Methods", Official Journal of the European Patent Office, Nov. 1, 2007, pp. 592-593, vol. 30, No. 11.

Dale, et al., "Dynamic Document Delivery: Generating Natural Language Texts on Demand", 6 pages, dexa, pp. 131, 9th International Workshop on Database and Expert Systems Applications (DEXA '98), 1998.

International Search Report for PCT/US04/13595 dated Sep. 12, 2008.

Chai, Joyce, et al., "Natural Language Assistant: A Dialog System for Online Product Recommendation", AI Magazine, La Canada, Summer 2002, vol. 23, issue 2, p. 63.

(56) References Cited

OTHER PUBLICATIONS

Gardner, G. "Silicon Wadi", Jerusalem Post. Jerusalem: Feb. 14, 2002.
Scorbitz / Get on Board, http://getonboard.scorbitz.com, 9 webpages downloaded Aug. 23, 2012.
Story Writer Code, 2005.
Explanatory Summary, 2005.
Fantasy Journalist website, retrieved at <http://www.fantasyjournalist.com> on Jan. 17, 2014, 5 pages, (author unknown).
Office Action received for U.S. Appl. No. 13/338,409, dated Sep. 22, 2017, 17 pages.

\* cited by examiner

Story Type 300

- Word Category 310
  - Word List 312
    - Word Definition 314
- Paragraph Type 330
  - Paragraph Definition 322
- Story Flavor 330
  - Paragraph Type Set 332

```
SCAN FANTASY LEAGUE DATABASES FOR NEW CONTENT
802
          ↓
SELECT A NARRATIVE TEMPLATE
804
          ↓
FILL DATA SLOTS WITH DATA FROM THE NEW CONTENT
806
          ↓
FILL WORD SLOTS WITH WORDS SELECTED ACCORDING
TO THE DATA FROM THE NEW CONTENT
808
          ↓
PUBLISH THE TEMPLATE WITH THE SLOTS FILLED
810
```

FIG. 8

TECHNIQUES FOR PROVIDING A NARRATIVE SUMMARY FOR FANTASY GAMES

CROSS-REFERENCE TO RELATED APPLICATIONS

This application is related to co-owned and co-pending U.S. patent application Ser. No. 13/338,409, titled "TECHNIQUES FOR PROVIDING A NATURAL LANGUAGE NARRATIVE," filed on Dec. 28, 2011, which is incorporated by reference in its entirety.

BACKGROUND

A fantasy game is one where participants act as an owner to build a team that competes against other fantasy owners based on statistics generated by real individual players of a game. Fantasy sport is a class of fantasy games. For instance, a fantasy owner might draft a fantasy football team to compete with other fantasy football teams based on statistics generated by real football players from the National Football League (NFL). A common variant uses a computer model to convert statistical performance into points that are compiled and totaled according to a roster selected by a manager of a fantasy team. As with a real team, a fantasy owner is given various online tools to sign, trade and cut fantasy players just like a real team owner.

Various websites may provide online setup and fantasy team management services for registered users. Such websites may offer other content in addition to the fantasy leagues, and may wish to increase content consumption, build product loyalty, increase online advertising revenue and attract new consumers.

BRIEF DESCRIPTION OF THE DRAWINGS

FIG. 3 illustrates a story type structure in accordance with one or more embodiments.

FIG. 8 illustrates a logic flow in accordance with one or more embodiments.

DETAILED DESCRIPTION

Figure 1:
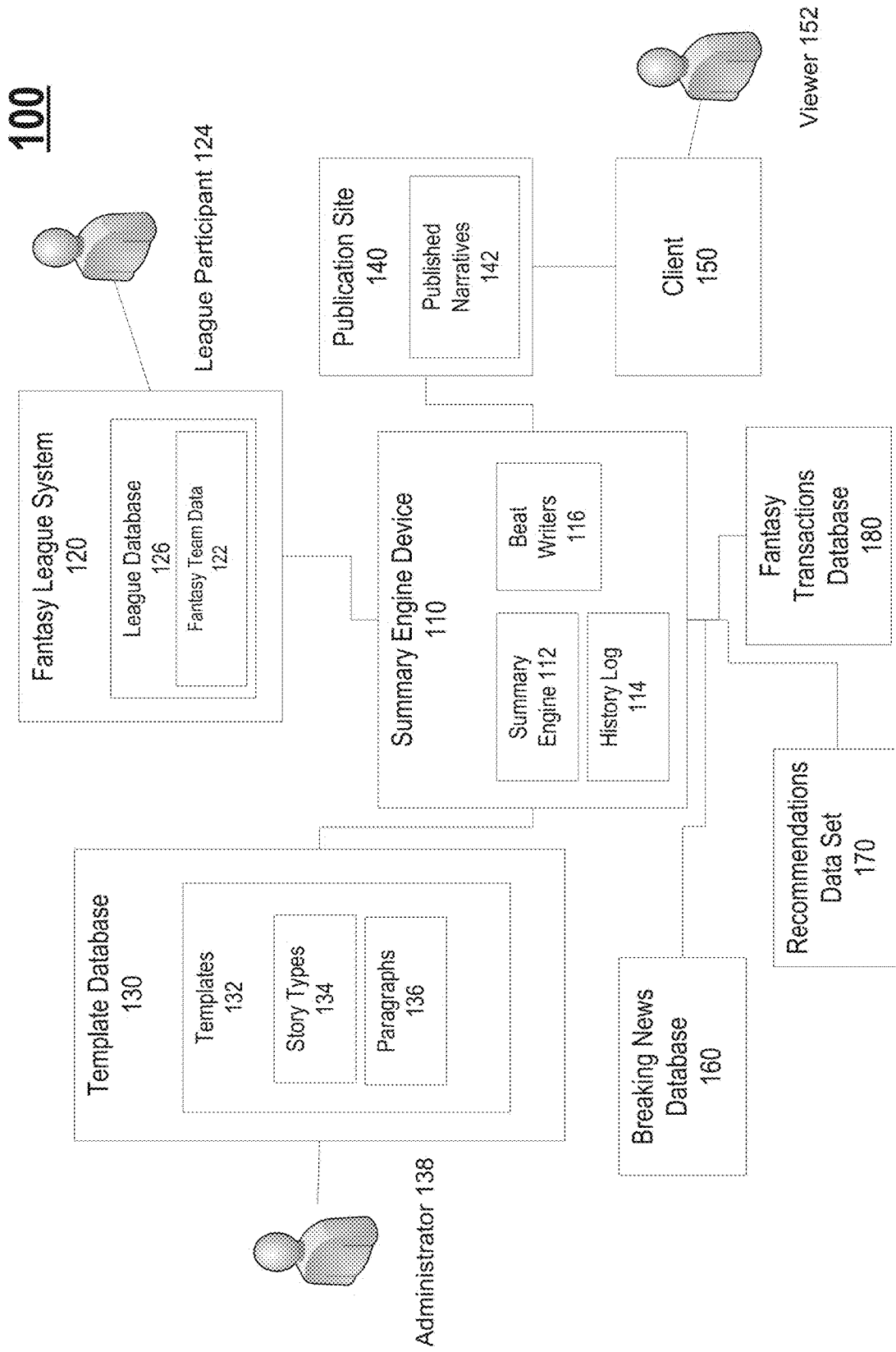
FIG. 1 illustrates a first system for providing a narrative summary for fantasy games in accordance with one or more embodiments.

Various embodiments are directed to an apparatus and technique to generate narrative summaries about events that take place in a fantasy games league, similar to stories that a journalist might write for a relevant news publication. The embodiments may automatically generate content, e.g. narrative stories, from data generated by a fantasy games league system. The content may be generated using templates that have slots for data, and dynamic word choices. The content may be published in various formats. The content may be published at irregular intervals, to simulate human-generated content. In an embodiment, the amount of stories generated about a particular fantasy team may be dependent on the frequency and/or amount of activity of the team owner within the system.

In general, a game is a system in which players engage in an artificial conflict, defined by rules and a scoring system, resulting in a quantifiable outcome. A fantasy game is a game based on a quantifiable outcome of another game. More particularly, a fantasy game uses a scoring system that is based, at least in part, on a quantifiable outcome of another game in order to obtain a quantifiable outcome for the fantasy game. For instance, a fantasy sport game may comprise a fantasy team selected from human players of a real sport. The fantasy sport game may convert statistical information of human player performance in real sporting competitions (e.g., a football game, a baseball game, etc.) into points that are compiled and totaled according to a roster of a fantasy team. Fantasy players of the fantasy sport game then compete based on the totaled points.

Fantasy games may be based on any type or genre of games. Some examples of games may include without limitation sports, board games, video games, games of chance, lawn games, tabletop games, party games, dexterity games, coordination games, card games, dice games, domino and tile games, guessing games, video games, electronic games, electronic video games, online games, role-playing games, business games, simulation games, television games, reality television games, artificial reality games, and so forth. A fantasy game may be based on any of these or other types of games. A particularly large segment of fantasy games focus on sports, such as football, basketball, baseball, soccer, hockey, racing, and so forth. Recently, emerging fantasy game genres have branched out to include non-sports related games focused on politics, celebrity gossip, movies, and reality television. For instance, fantasy congress is a fantasy game where players, called citizens, could draft members of the United States House and Senate, and keep track of their participation within the U.S. Congress. Actions, especially within the process of making and amending pieces of legislation, of a player's drafted congresspersons are recorded and rated as a cumulative total amount of points against other players. The embodiments are not limited in this context.

Fantasy games may have many fantasy game genres. For example, fantasy sport is a class of fantasy games. A fantasy owner might draft a fantasy football team to compete with other fantasy football teams based on statistics generated by real football players from the National Football League (NFL). Fantasy reality TV is another class of fantasy games. For instance, a fantasy owner might draft a fantasy reality team to compete with other fantasy reality teams based on statistics generated by reality show contestants, such as contestants for such reality shows as Big Brother, Survivor, American Idol, Dancing With The Stars, The Apprentice, Fear Factor, The Amazing Race, and so forth. Fantasy board is another class of fantasy games. For instance, a fantasy owner might draft a fantasy board game team to compete with other fantasy board game teams based on statistics generated by board game contestants, such as chess players, poker players, checker players, monopoly players, or other board games. Fantasy electronic is another class of fantasy games. For instance, a fantasy owner might draft a fantasy electronic game team to compete with other fantasy electronic game teams based on statistics generated by electronic game contestants, such as electronic video game players, electronic gambling game players, and other electronic games. The embodiments are not limited in this context.

FIG. 1 illustrates a narrative system 100 arranged to generate narrative summaries of events automatically based on data about the event. In an embodiment, narrative system 100 may use templates that include slots for data and for dynamic word choice. The templates may be chosen randomly. A sub-set of templates may be chosen according to criteria, and a template may be chosen randomly from the sub-set. Once the template is filled out to create a story, the story may be published in a variety of locations and formats.

In one embodiment, for example, the narrative system 100 may comprise a computer-implemented system having multiple components, such as a summary engine device 110, a fantasy league system 120, a template database 130, a publication site 140, a breaking news database 160, a recommendations data set 170 and a fantasy transactions database 180. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the narrative system 100 may be implemented by one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the narrative system 100 as shown in FIG. 1 has a limited number of elements in a certain topology, it may be appreciated that the survey system 100 may include more or less elements in alternate topologies as desired for a given implementation.

The computing entities or devices of narrative system 100 may be communicatively coupled via a network, which may be implemented via various types of communications media, including wired or wireless communications media. The network may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The computing entities or devices of narrative system 100 may include various types of standard communication elements designed to be interoperable with the network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between computing entities or devices of survey system 100 can be in the form of a data packet adapted to be transmitted between two or more computer processes. The data packet may include a cookie and/or associated contextual information, for example.

In an embodiment, narrative system 100 may include summary engine device 110. Summary engine device 110 may include one or more electronic devices that are capable of receiving data about events, selecting a template, populating the template, and publishing the populated template. In particular, summary engine device 110 may include a summary engine 112. Summary engine 112 may include programming instructions that, when executed on a logic device, populate the slots in a template and publish it. Summary engine 112 is described further with respect to FIG. 5.

Summary engine device 110 may further include a history log 114. History log 114 may keep track of what content has already had a story generated about it, and/or what templates have been used and when. Summary engine 112 may refer to history log 114 when generating a story to prevent duplication of content, and to prevent re-use of a template that was recently used. Re-use of a template too soon may erode the effect that a human is generating the content.

Summary engine device 110 may further include beat writers 116. A beat writer 116 may be a functional construct that represents a computerized author. A beat writer 116 may be customized to create a writing "personality" that may generate articles that are different from articles written by a differently customized beat writer 116. Summary engine 116 may use a beat writer 116 to specify and constrain the content and style of writing used to generate narrative summaries.

A beat writer 116 may be created by a fantasy league manager, and/or by individual fantasy team owners. A fantasy league manager may configure settings that may apply to all beat writers 116 within a fantasy league. For example, a fantasy league manager may specify what frequency and/or amount of activity a league participant 124 must have before a beat writer 116 may write about that participant's team, and/or connect a frequency of participant activity to a frequency of publication by a beat writer 116. A fantasy league manager may allow league participants 124 to select whether they want their team to be followed by a beat writer 116. A fantasy league manager may assign a beat writer 116 to all teams within the league. An example of a beat writer is described further with respect to FIG. 2.

Narrative system 100 may include fantasy league system 120. Fantasy league system 120 may be a component of summary engine device 110, or may operate on a different device accessible over communication media to summary engine device 110. While only one fantasy league system is shown, embodiments may include multiple fantasy league systems, storing data for different fantasy leagues.

Fantasy league system 120 may include fantasy team data 122. Fantasy team data 122 may be a database that includes any data used in the operation of a fantasy league. Fantasy team data 122 may include data for a plurality of fantasy teams. For any one fantasy team, fantasy team data 122 may include, without limitation, player names, player performance metrics, team lineup, the owner name, a beat writer 116 configuration for the team, recent transactions affecting the team, and so forth. Fantasy team data 122 may also include data about a team over time, such as which players are used more, playing time of players, and so forth. The embodiments are not limited to these examples.

Fantasy league system 120 may include league database 126. League database 126 may include any data used in the configuration and management of a fantasy league. League database 126 may include, without limitation, lineup setting deadlines, processes (e.g. new player acquisition), trade policies, trade deadlines, the league manager, beat writers 116 configuration for the league, types of permitted actions, schedules, participant information, and so forth. In an embodiment, fantasy team data 122 may be a component of league database 126.

League participants 124 may include people who register with fantasy league system 120 to participate in a fantasy league. League participants 124 may include team owners and league managers. A team owner may be a league participant 124 who assembles a fantasy team. A league manager may be a league participant 124 who oversees the operation of a group of fantasy teams that comprise a league, including, for example, setting rules for the league. A league manager may also be a team owner. League participants 124 may be individually identifiable to fantasy league system 120, and may need to authenticate themselves to fantasy league system 120 before engaging in fantasy league activities. Fantasy league activities may include, without limitation, logging into fantasy league system 120, generating reports about a fantasy team, and roster transactions such as trades and dropping a fantasy player.

Narrative system 100 may include template database 130. Template database 130 may be stored on summary engine device 110, or may be stored on a different device accessible over communication media to summary engine device 110. Template database 13 may include templates 132.

In an embodiment, templates 132 may include story types 134 and paragraphs 136. A story type 134 may be a container for various narrative structures. A story type 134 may, for example, include different lists of words and different paragraph types to choose from. Selecting a particular story type 134 from among multiple story types 134 may constrain the choices when building a story from templates 132. Paragraphs 136 may include specific sets of sentences that include both static text and slots for dynamic data and/or word choice. Story types 134 are described further with respect to FIG. 3. Paragraphs 136 are described further with respect to FIG. 4.

Templates 132 may be generated by an administrator 134. An administrator 134 may be a person who writes the sentences and paragraphs that may be included in a template 132. Administrator 134 may further create lists of words that may be used to fill a dynamic word slot. Administrator 134 may also set conditions that, when satisfied, direct a choice during a story generation. In an embodiment, administrator 134 may be partly or completely automated using a computer application.

Narrative system 100 may include a publication site 140. Publication site 140 may be a component of summary engine device 110, or may be separate from summary engine device 110. Publication site 140 may include, without limitation, a website, a real simple syndication (RSS) feed, an e-mail message, a news ticker, a social network site, a short messaging service (SMS) message, a multimedia messaging service (MMS) message, a text-to-speech telephone message, and a radio broadcast.

Publication site 140 may include published narratives 142. Published narratives 142 may include a representation, e.g. text, audio, and/or video, of a template 132 that has been filled with fantasy team data 122. Published narratives 142 may be presented from hypertext markup language (HTML) coded pages, extensible markup language (XML) coded pages, JAVA applets, plain text, and so forth, or a combination thereof. Published narratives 142 may be presented as an audio stream generated by a text-to-speech conversion from the filled template. Published narratives 142 may be presented as a video stream created from a computer image, such as an avatar, "speaking" the story from a text-to-speech conversion from the filled template. The embodiments are not limited to these examples. While one publication site 140 is shown in FIG. 1, embodiments may include multiple publication sites 140, for example, for each different type of publication. In an embodiment, published narratives 142 may be stored, e.g. as an archive, on publication site 140 and/or on summary engine device 110 and/or on fantasy league database 120.

In an embodiment, publication site 140 may publish published narratives 142 at irregular intervals, for example, at randomly selected times, to simulate the somewhat random nature of publication by human journalists. When multiple narrative summaries about a team are generated at once, publication of some of the narrative summaries may be delayed. This may also encourage viewers 150 to check back at publication site 140 more frequently. In an embodiment, summary engine 112 may control when narrative summaries are published to publication site 140. In an embodiment, a publishing "schedule" may be in part random, and in part event driven. For example, most publication may apparently random, except when a breaking news story occurs.

In an embodiment, publication may take place on publication sites 140 that are external to fantasy league system 120, for example, a blog posts on a league participant's personal blog, or on a social networking site such as, but not limited to, WINDOWS® LIVE MESSENGER®, FACEBOOK®, GOOGLE+®, TWITTER®, MYSPACE®, and DIASPORA. Publication on external sites may allow others, e.g. those who are not league participants 124, to subscribe or follow content generated by summary engine 112. In an embodiment, summary engine 112 may be aware of how many followers a beat writer 116 may have, and may adjust a publishing schedule accordingly. For example, a beat writer 116 with many followers may publish more frequently than a beat writer 116 with fewer followers.

Narrative system 100 may include a client device 150. Client device 150 may be a wired or wireless computing device operating a browser, application viewer or other application program suitable for receiving and displaying published narratives 142 from publication site 140. Client device 150 may receive and respond to control directives from a viewer 152 via a suitable GUI and various input/ output (I/O) devices, such as input from an input device that causes a browser to connect to publication site 140 and received a published narrative 142. Examples of suitable web browsers may include, without limitation, Internet Explorer® by Microsoft® Corp., Safari® by Apple Inc., or Chrome® by Google®, among others.

In an embodiment, viewer 152 may also be a league participant 124, and may use client device 150 to interact with fantasy league system 120. Viewer 152 may not be a league participant 124, but may still be able to view published narratives 142 from client device 150.

Narrative system 100 may include one or more databases from which published narratives 142 may be generated. For example, narrative system 100 may include, without limitation, a breaking news database 160, a recommendations data set 170, and a fantasy transactions database 180. Databases 160, 170, and 180 may be separate databases, or may be combined in any combination with each other, and/or with fantasy team data 122 and/or league database 126.

Breaking news database 160 may include recent news about the real players who are represented in a fantasy team. For example, if a real player on a real sports team is injured and cannot play, news of the injury and the length of time the player will be on the disabled list may be entered into breaking news database 160. In an embodiment, when a new entry is made in breaking news database 160, summary engine 112 may be notified so that a published narrative 142 may be created about the news.

Recommendations data set 170 may include recommended transactions for a team or a player. The recommendations may be made by an artificial intelligence system (not shown) that may be a component of fantasy league system 120. In an embodiment, summary engine 112 may check recommendations data set 170 when it looks for content to write about. A beat writer 116 may treat a recommended transaction as a rumor or speculation, for example.

Fantasy transaction database 180 may include the transactions made within a fantasy league. Fantasy transaction database 180 may be a component of fantasy league system 120. Transactions may include, without limitation, a trade of players, a drop of a player from a team, an addition of a player to a team, and so forth.

Figure 2:
FIG. 2 illustrates a beat writer in accordance with one or more embodiments

FIG. 2 illustrates a beat writer 200 in accordance with one or more embodiments. Beat writer 200 may be a representative embodiment of a beat writer 116. Beat writer 200 may include one or more settings, such as personal traits 210, style/personality 220, content type 230, and publication settings 240. Beat writer 200 may have more, fewer, or other settings than those depicted.

Personal traits 210 may include settings that anthropomorphize a beat writer 200. Personal traits 210 may include, for example, a name, a face, a voice, a video avatar, a title, a gender, and so forth.

Style/personality 220 may include settings that may determine which templates are selected and what kinds of inputs are used. Examples of style/personality 220 include "critical", "optimistic", "overly optimistic", "pessimistic", "pragmatic", "factual", and so forth. A beat writer 200 with a "critical" style/personality 220 may write about negative occurrences, e.g. losses and errors, more than positive occurrences, e.g. wins and perfect plays. A beat writer 200 with a "factual" style/personality 220 may report the facts of an event without additional emotional or descriptive content. The embodiments are not limited to these examples.

Content type 230 may include settings for the types and formats of the published narratives 142 that beat writer 200 may generate. Content type 230 may include, for example, articles, news ticker blurbs, radio interviews, quick summaries of an event, and so forth. A beat writer 200 may have more than one content type 230 selected.

Publication settings 240 may include settings that determine where published narratives 142 may be published, e.g. at which publication sites 140. Examples of publication sites 140 may include, without limitation, a website, a fantasy league website home page, a real simple syndication (RSS) feed, an e-mail message, a news ticker, a social network site, a short messaging service (SMS) message, a multimedia messaging service (MMS) message, a text-to-speech telephone message, and a radio broadcast.

A fantasy league manager may specify what frequency and/or amount of activity a league participant 124 must have before a beat writer 116 may write about that participant's team, and/or connect a frequency of participant activity to a frequency of publication by a beat writer 116. For example, a league participant 124 who logs in to fantasy league system 120 every day may be rewarded by having more stories written about his team. A league participant 124 who logs in only once a week may have much fewer stories written about her team, in comparison. Other activities that may be "rewarded" with more beat writer coverage may include trades and other transactions, generating reports, inviting others to register with fantasy league system 120 and so forth.

In an embodiment, a beat writer 200 may be configured to allow others to comment on the content published by the beat writer. A beat writer 200 may be configured to track how many views of a published narrative are received, or to allow others to rate and/or review a published narrative.

FIG. 3 illustrates a story type 300 in accordance with one or more embodiments. Story type 300 may be a logical container structure for various template components. A story type 300 may generally describe the story that is told by the story type. For fantasy league stories, for example, different story types may include a transaction summary, a breaking news story, and a matchup summary. A transaction summary may be a story type that describes a fantasy team transaction, such as a trade. A breaking news story may be a story type that describes a breaking news event. A matchup summary may be a story type that describes how two fantasy teams matched up with respect to each other after real sports events involving the players represented in the fantasy teams, e.g. which fantasy team "won". Story types may be mixed and combined to generate a template 132 for an event.

As shown in FIG. 3, story type 300 may include one or more word categories 310. A word category 310 may be a container for sets of word lists 312. A word category 310 may be associated with properties such as a specific sport.

A word list 312 may be a container, e.g. an array, for a set of word definitions 314. A word list 312 may optionally be bound to a data field from fantasy team data 122 such that the value of a data element may affect word choice in filling in the template.

Word definitions 314 may include specific words or phrases, e.g. static text strings, that may be used in a paragraph. In an embodiment, a particular word list 312 may include word definitions 314 that are essentially synonyms. Selecting a particular word definition 314 from the word list 312 may therefore still convey the same meaning as any other word definition from the same word list 312, while providing variety among instances when the same sentence is used.

Word definitions 314 in a word list 312 that is bound to a data field may include a margin value. A margin value may include a range of values to which the data in the associated data field may be compared. When the data in the data field is within the margin for the word definition 314, a condition may be satisfied that causes the word definition 314 to be used.

Story type 300 may also include one or more paragraph types 320. A paragraph type 320 may be a container for a set of paragraph definitions 322. A paragraph type 300 may describe the paragraph in some way, for example, by what data is presented, by what tone is conveyed, and so forth. A paragraph type 320 may optionally be tied to a specific sport or event type. A paragraph type 320 that is not tied to a specific sport or event type may be used for any event that uses the story type 300 containing the paragraph type 320.

Paragraph definitions 322 may include the actual paragraph "blueprint" or template. Paragraph definitions 322 may, for example, include specific sentences, including static text, and the template slots to receive data and word choices from word lists 312. An example of a paragraph definition 322 is described in further detail with respect to FIG. 4.

Story type 300 may also include one or more story flavors 330. A flavor may represent a style, tone, theme, or other grouping and structure of paragraphs in a story. A story flavor 330 may include a paragraph types set 332, which may be a list of references to a set of paragraph types 320 that may be used for a particular story flavor 330. A story flavor 330 may be optionally reserved for a specific event type, or may be open to use for any event.

Figure 4:
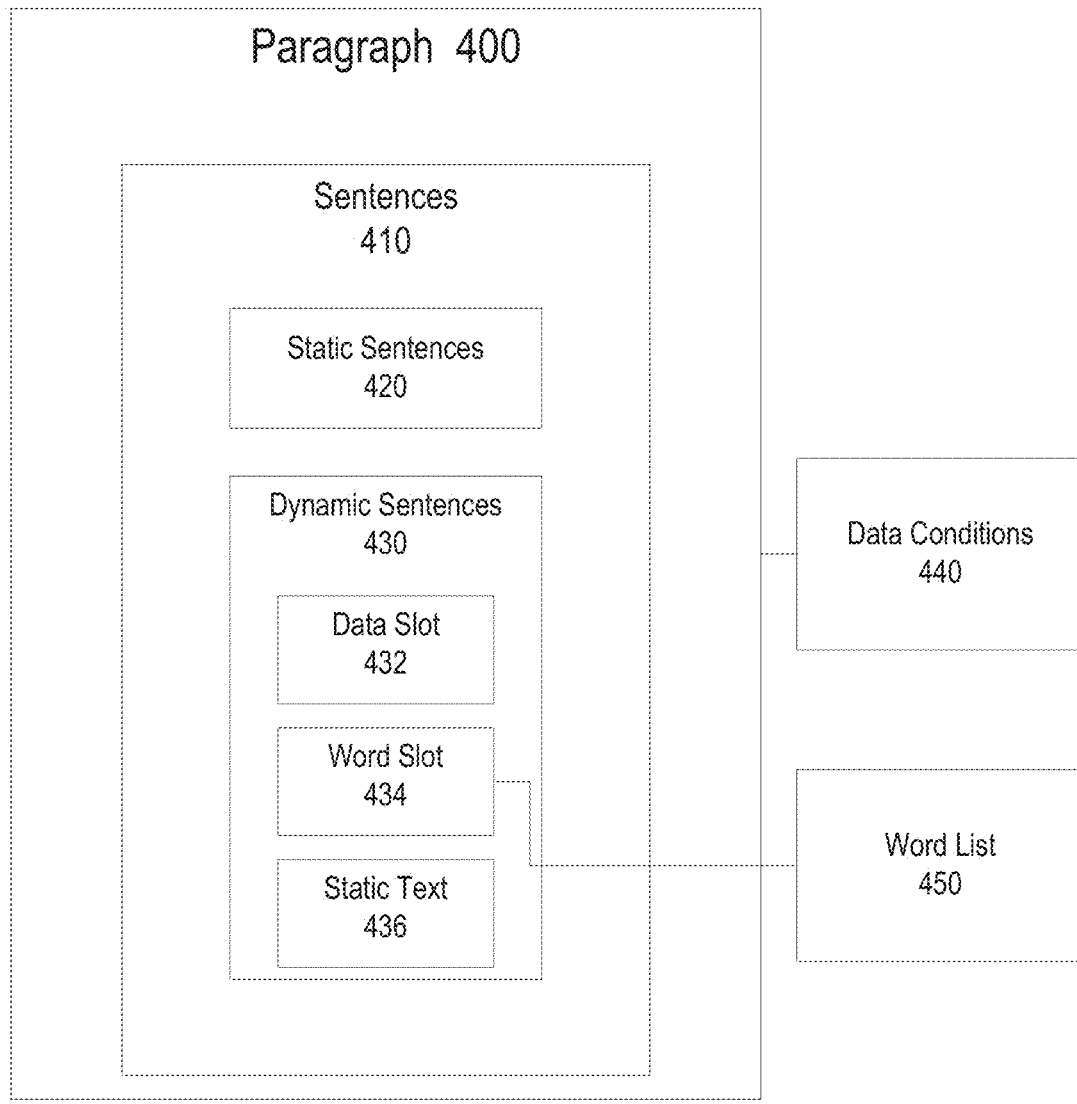
FIG. 4 illustrates a paragraph structure in accordance with one or more embodiments.

FIG. 4 illustrates a paragraph 400 in accordance with one or more embodiments. Paragraph 400 may be a representative example of a paragraph definition 322. As in written grammar, a paragraph 400 may be a group of closely related sentences that convey one topical point. As such, paragraph 400 may include one or more sentences 410.

Sentences 410 may include static sentences 420. Static sentences 420 may be sentences that have no variable elements. That is, none of the words in a static sentence 420 may be changed by summary engine 110.

Sentences 410 may include dynamic sentences 430. Dynamic sentences 430 may have at least one variable element. For example, a dynamic sentence 430 may have a data slot 432. A data slot 432 may be a placeholder in dynamic sentence 430 that may be filled with an item of fantasy team data 122. A data slot 432 may exist, for example, for a team name, a player name, a date, a location, a score, and so forth. A data slot 432 allows a dynamic sentence 430 to be re-used for multiple events.

Dynamic sentences 430 may include a word slot 434. A word slot 434 may be a placeholder in dynamic sentence 430 that may be filled with a word definition 314 from word list 450. Word list 450 may be a representative embodiment of word list 312. A particular word definition 314 may be selected to fill a word slot 434 randomly from word list 450. In an embodiment, word slots 434 may be used generally for adjectives, adverbs, verbs and some nouns.

A dynamic sentence 430 may include static words 436. Static words 436 are words that are not variable. Static words 436 may include, for example, articles, prepositions, and punctuation.

In an embodiment, sentences 410 may be affected by data conditions 440. Data conditions 440 may be used to control the flow of a story according to conditions in the fantasy team data 122 for a story. A data condition 440 may generally have true or false value. A data condition 440 may determine which of several sentences or paragraphs are selected for a story. A data condition 440 may determine what word list 450 to choose from to fill a word slot 434. For example, if a fantasy team wins a matchup, a paragraph type associated with a win event may be selected instead of a paragraph type that is associated with a loss event.

Figure 5:
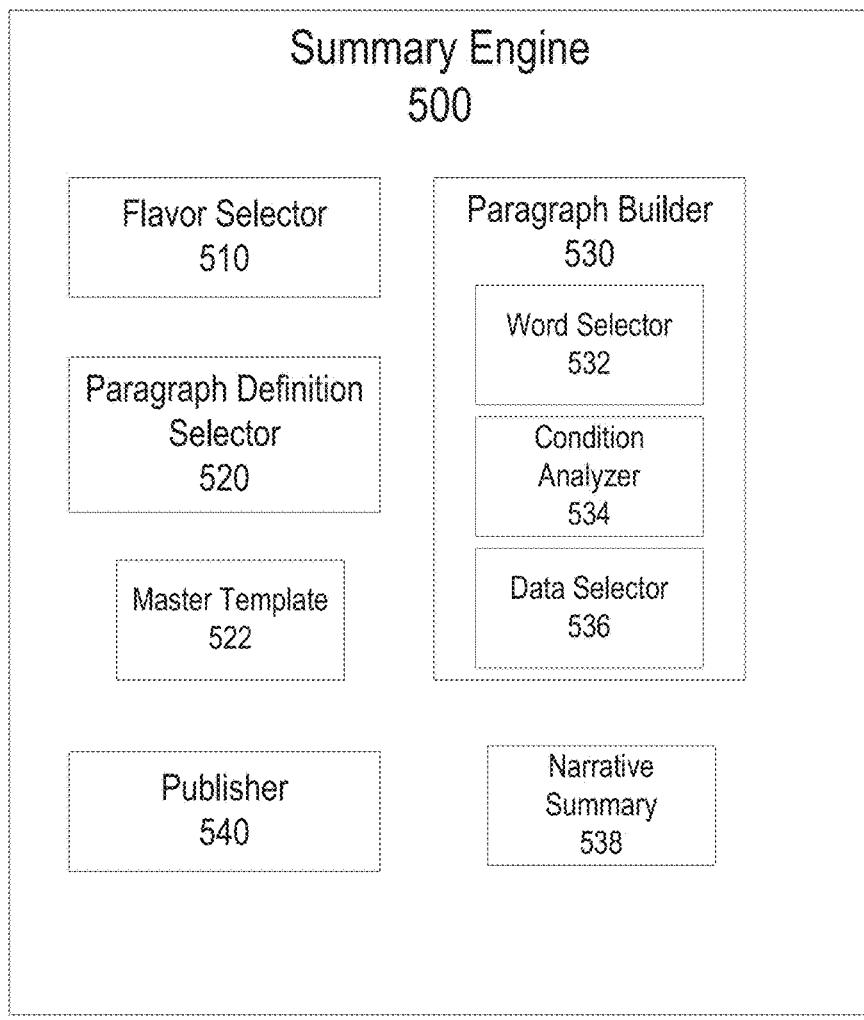
FIG. 5 illustrates a summary engine in accordance with one or more embodiments.

FIG. 5 illustrates an embodiment of a summary engine 500. Summary engine 500 may be a representative embodiment of summary engine 112. Summary engine 500 may include one or more functional components, such as a flavor selector 510, a paragraph definition selector 520, a paragraph builder 530, and a publisher 540. Summary engine 500 may have more, fewer, or other functional components than those depicted.

Summary engine 500 may periodically examine fantasy team data 122 and identify new content in fantasy team data 122 that has not had a narrative summary generated for it yet. In an embodiment, when new content exists, summary engine 500 may determine what story type would apply to the new content and whether all of the data needed for that story type is present. When enough new content exists for a story type 134, 300, summary engine 500 may begin generating a narrative summary.

Flavor selector 510 may select a story flavor 330 for the selected story type 134, 300. In an embodiment, the story flavor 330 may be chosen at random from the story flavors associated with the story type selected for the event data. In another embodiment, the story flavor 330 may be selected, at least in part, according to a set of criteria, for example, what fantasy team data 122 is available, and/or what style/personality 220 the relevant beat writer 200 has.

Paragraph definition selector 520 may select a paragraph definition 322 for each paragraph type 320 associated with the selected story flavor 330. Paragraph definition selector 520 may randomly choose a paragraph definition 322 within a given paragraph type 320. In an embodiment, paragraph definition selector 520 may randomly select a paragraph definition 322 according to a set of criteria, for example, what fantasy team data 122 is available and/or what style/personality 220 the relevant beat writer 200 has. The paragraph definitions 322 selected for a particular narrative summary may be appended together to form a master template 522.

Paragraph builder 530 may load a paragraph 400 for each of the paragraph definitions 322 in the master template 522. Paragraph builder 530 may parse the paragraph 400 to determine what word slots 434 and data slots 432 are to be filled. Paragraph builder 530 may have a word selector 532 component to select a word at random from a word list 450 associated with a word slot 434. Paragraph builder 530 may have a data selector 536 component to insert an actual data value from fantasy team data 122 into a data slot 432. Paragraph builder 530 may have a condition analyzer 534 component to evaluate conditions that are present in a paragraph definition 322, or associated with a story flavor 330 or story type 300. When a condition is true, a choice associated with the condition is followed. For example, an additional sentence or paragraph may be added to master template 522, or one word list may be chosen instead of another. The embodiments are not limited to these examples.

When paragraph builder 530 has filled all word and data slots, and evaluated all conditions in master template 522, the result is narrative summary 538. Narrative summary 538 may be, for example and without limitation, a text file, a rich text file, an HTML file, or an XML file.

Publisher 540 may receive the narrative summary 538 from paragraph builder 530 and may prepare the narrative summary 538 for publication. Preparing narrative summary 538 may include formatting the narrative summary 538 according to a format used by publication site 140. For example, publisher 540 may convert a text file narrative summary to an HTML file or XML file for publication on a website. In another example, publisher 540 may use text-to-speech conversion on a text file narrative summary to generate an audio stream. The embodiments are not limited to these examples.

Figure 6:
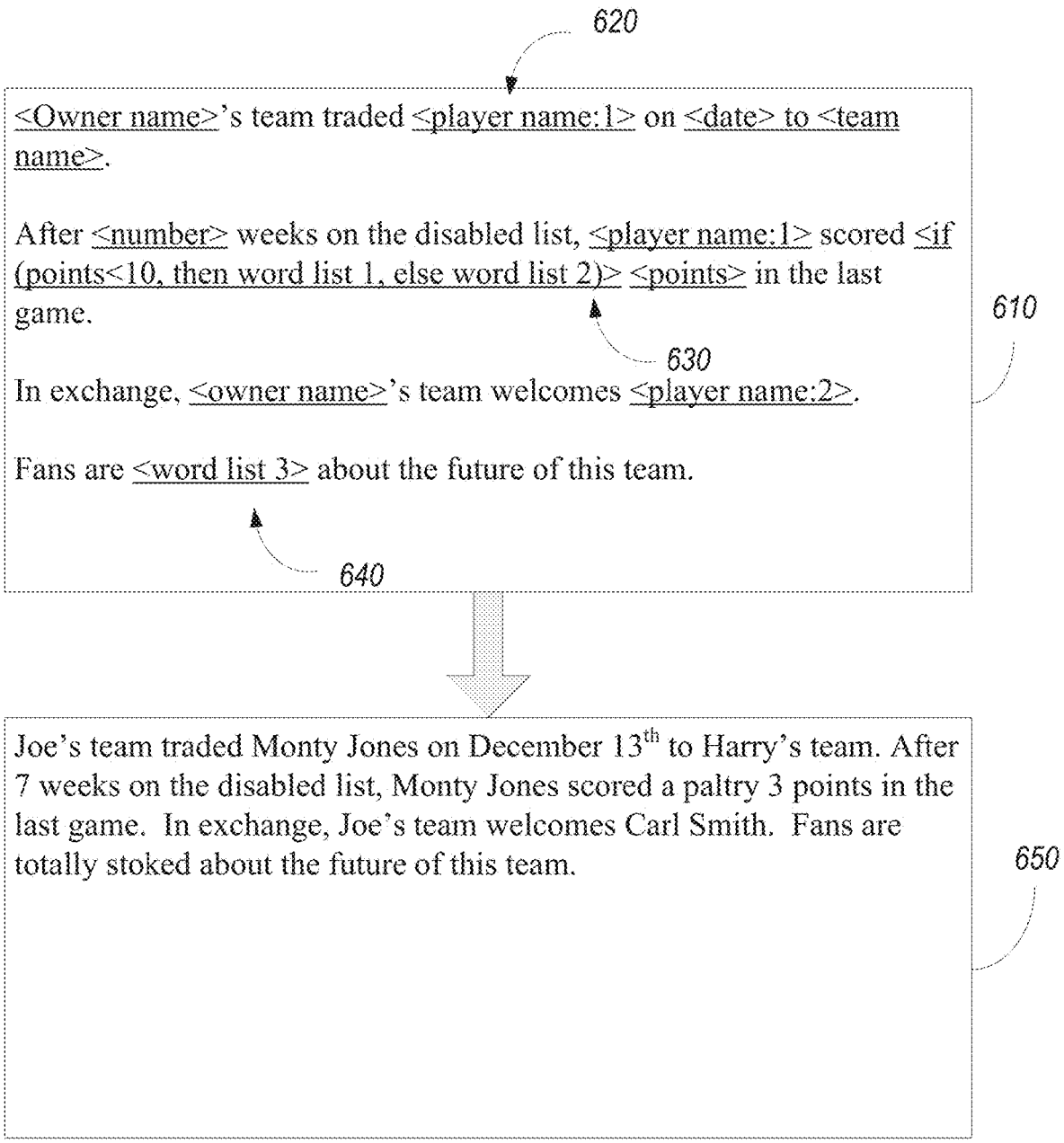
FIG. 6 illustrates an example of a template before and after a narrative summary is generated in accordance with one or more embodiments.

FIG. 6 illustrates an example of a portion of a master template 610, in pseudo code, before and after the word and data slots are filled. The portion depicted reports a trade transaction. Master template 610 has, for example, a data slot 620, a conditional word slot 630 and a word slot 640. Data slot 620 is a placeholder for a player's name that is being traded away from a fantasy team. Conditional word slot 630 has a condition that determines which word list to select from, depending on how many points the traded-away player scored after returning from being disabled. Word slot 640 indicates that a word is to be selected from word list 3. The sentences within master template 610 are shown spaced apart for clarity, and may be more closely spaced in an embodiment.

When master template 610 has been processed by paragraph builder 530, in an embodiment, it may look like narrative summary 650. In narrative summary 650, data slot 620 has been filled with the player name of "Monty Jones." Conditional word slot 630 evaluated to "true" and a negative word definition "a paltry" was selected randomly from word list 1 to describe the number of points scored. Word list 1 may include, for example, negative or critical adjectives. Word list 2 may have included, for example, neutral or praising adjectives related to higher points scored. Word slot 640 was filled randomly from word list 3 with the word definition "totally stoked." A differently configured beat writer 116, 200 may have had different word lists to select from, or a different paragraph altogether to report the same information. The embodiments are not limited to these examples.

Figure 7:
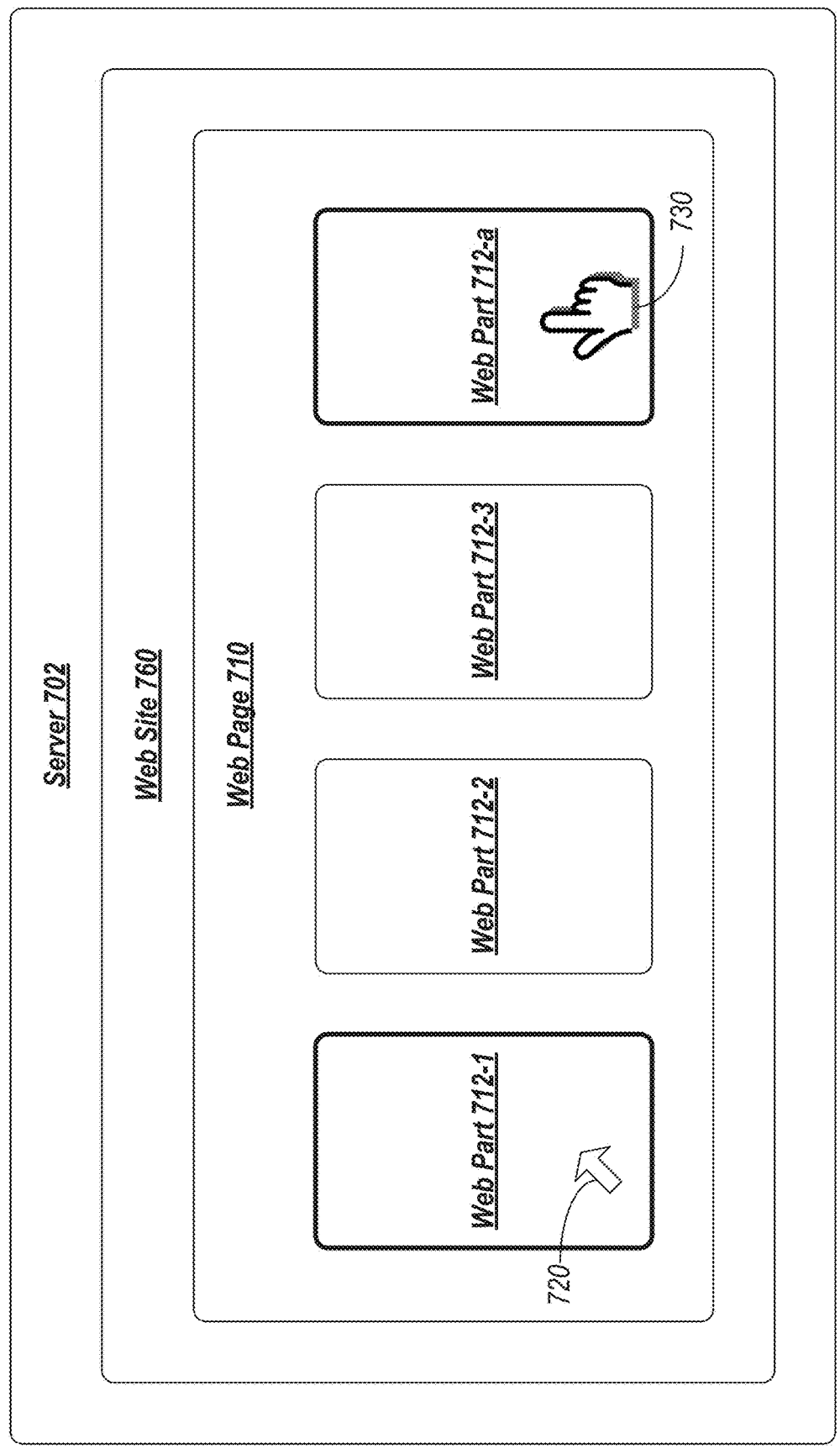
FIG. 7 illustrates an example of a user interface.

FIG. 7 illustrates an embodiment of a user interface view 700. The user interface view 700 illustrates an embodiment where a server 702 hosts content on a web site 760, which is implemented as one or more web pages 710. Server 702 and web site 760 may be representative embodiments of a publication site 140 and/or a fantasy league system 120 web site. The web page 710 may comprise, for example, a landing page or home page for web site 760. The web page 710 may include various user interface elements designated as web parts 712-*a*, with a representing any positive integer. A user, e.g. viewer 152, may select various web parts 714-*a* using any number of input devices, such as by manipulating a pointer interface 720 or a gesture interface 730, for example.

Referring to FIG. 7, web site 760 may include a web page 710 that displays a published narrative 142. For example, suppose web part 712-1 displays a published narrative 142, web part 712-2 may display another published narrative 142, and web part 712-*a* displays an advertisement for a product or service. Web part 712-3 may display information such as web site navigation links, viewer comments, a search interface, and so forth. Adding new published narratives 142 frequently may encourage viewers 152 to return to web site 760 often, which may increase advertising revenue from the increased traffic.

In an embodiment, web site 700 may keep track of what published narratives 142 are of interest to a particular viewer 152, for example, by noting which published narratives are read, shared, forwarded, and so forth, in a cookie file, for example. In an embodiment, web site 700 may provide feedback to summary engine 112 about the viewer 152's interests and obtain published narratives that are more closely aligned to the viewer 152's interests. The embodiments are not limited to these examples.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). Embodiments may also be at least partly implemented as instructions contained in or on a computer-readable medium, which may be read and executed by one or more processing units to enable performance of the operations described herein.

FIG. 8 illustrates a logic flow 800 in accordance with one or more embodiments. The logic flow 800 may be performed by various systems and/or devices and may be implemented as hardware, software, and/or any combination thereof, as desired for a given set of design parameters or performance constraints. For example, the logic flow 800 may be implemented by a logic device (e.g., processor) and/or logic (e.g., threading logic) comprising instructions, data, and/or code to be executed by a logic device. For purposes of illustration, and not limitation, the logic flow 800 is described with reference to FIGS. 1 through 5. The embodiments are not limited in this context.

In various embodiments, logic flow 800 may scan fantasy league databases for new content in block 802. For example, summary engine 112 may scan, or request data from, fantasy league system 120 for new fantasy team data 122 or league database 126. Summary engine 112 may also scan, or receive data from, databases 160, 170 and/or 180. Summary engine 112 may also, or in the alternative, receive a notification from one or more of the databases 122, 126, 160, 170, 180 that there is new data. "New" in the context of logic flow 800 may refer to data added to a database after a previous interaction with summary engine 112, or data that has not been used in a narrative summary before. Summary engine 112 may, in an embodiment, select a story type 300 and then scan one or more of the databases 122, 126, 160, 170, 180 for new data that may be used for that story type.

In various embodiments, logic flow 800 may select a narrative template in block 804. For example, summary engine 500 may select a story type 300, story flavor 330, and paragraph definitions 322 to generate a master template 522. Selecting a narrative template is described further with respect to FIG. 9.

In various embodiments, logic flow 800 may fill data slots with data from the event in block 806. For example, data selector 536 may identify what data elements from fantasy team data 122 may be used to fill in a data slot 432 and replace the data slot with the data in the master template 522.

In various embodiments, logic flow 800 may fill word slots with words selected according to the data from the event in block 808. For example, word selector 532 may select a word definition from a word list 450 for a word slot 434 and replace the word slot 434 with the word definition in the master template 522. In an embodiment, the selection of a word from a word list 450 may be random. At the conclusion of block 808, the master template 522 may be a narrative summary 538.

In various embodiments, logic flow 800 may publish the template with the slots filled in block 810. For example, publisher 540 may format a narrative summary 538 according to a publication site 140. For example, if publication site 140 is a web site, narrative summary 538 may be formatted as an HTML or XML document and stored on publication site 140 such that the narrative summary 538 is viewable as a published narrative 142 when the web site is accessed by a browser application on a client device 150. The embodiments are not limited to these examples.

Figure 9:
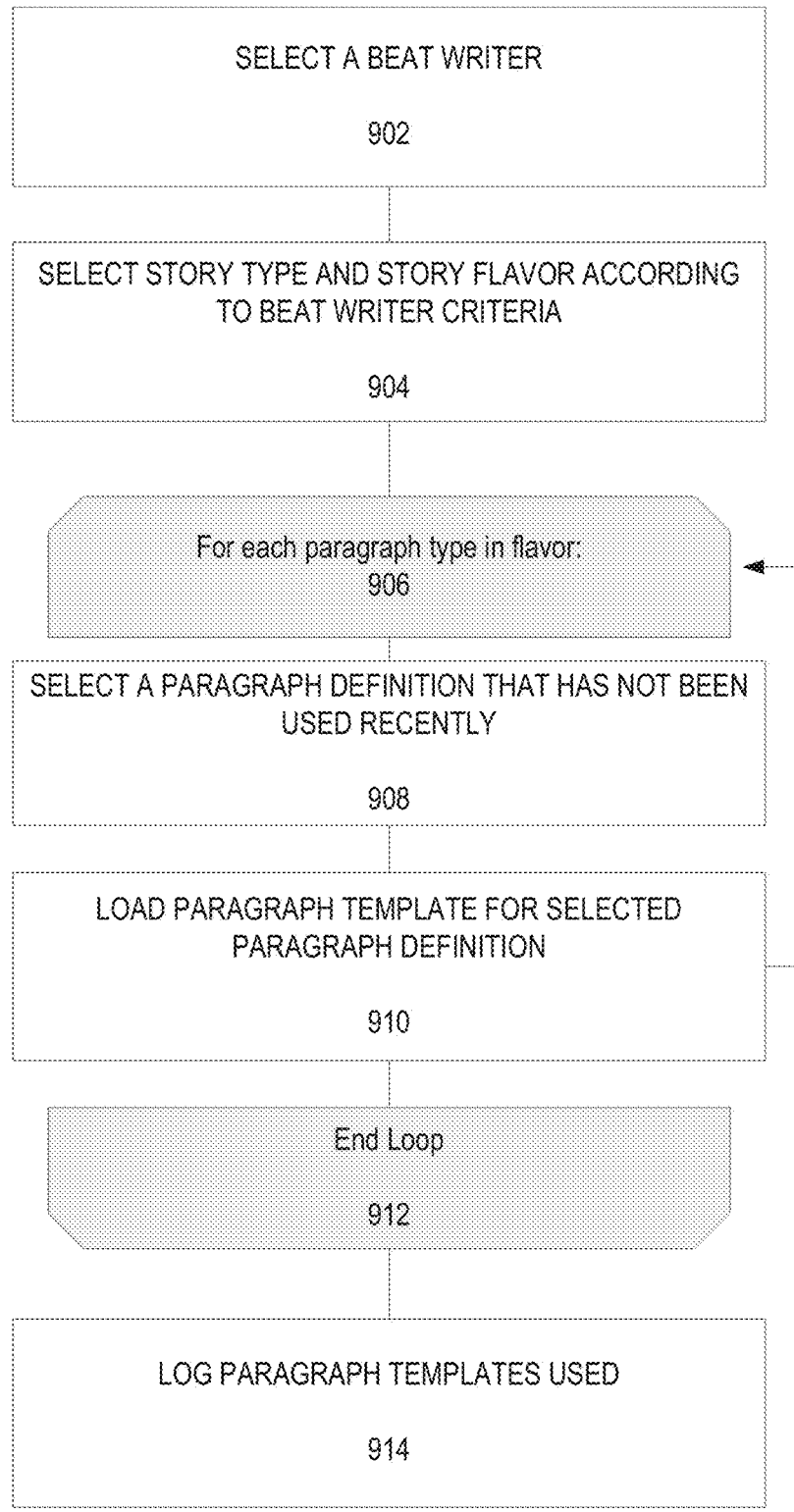
FIG. 9 illustrates a second logic flow in accordance with one or more embodiments.

FIG. 9 illustrates a logic flow 900 in accordance with one or more embodiments. Logic flow 900 may be a representative embodiment of block 804 in logic flow 800. Logic flow 900 may be performed by various systems and/or devices and may be implemented as hardware, software, and/or any combination thereof, as desired for a given set of design parameters or performance constraints. For example, the logic flow 900 may be implemented by a logic device (e.g., processor) and/or logic (e.g., threading logic) comprising instructions, data, and/or code to be executed by a logic device. For purposes of illustration, and not limitation, the logic flow 900 is described with reference to FIGS. 1 through 5. The embodiments are not limited in this context.

In various embodiments, logic flow 900 may select a story type according to criteria in block 902.

In various embodiments, logic flow 900 may select a story type and a story flavor according to beat writer criteria in block 904. In an embodiment, the beat writer specified for a particular team may constrain the story types available to choose from. Some beat writers 116, 200, for example, may not have a breaking news story type in their content type 230 settings. Summary engine 500 may select a story type 300 according to the beat writer criteria, e.g. style/personality 220 and/or content type 230. A story type 300 may be selected based on what data elements are available in fantasy team data 122 received, or retrieved, from one or more of the databases 126, 160, 170, 180. For example, when data about a player's injury is available, a breaking news story type may be selected. When a story type 300 has more than one story flavor 330, a story flavor 330 may be selected randomly from the available choices, for example, by flavor selector 510. Beat writer criteria may be applied to the story flavors 330 for a story type 300 to narrow the available choices. Beat writer criteria may include, for example, a style/personality 220 setting that determines what story flavors a beat writer 116, 200 may use.

In various embodiments, logic flow 900 may, beginning at block 906, select a paragraph definition, for each paragraph type in the story flavor, that has not been used recently, at block 908. For example, paragraph definition selector 520 may use paragraph type set 332 for the selected story flavor 330. Paragraph type set 332 may include references or links to the paragraph types 320 that a story flavor 330 may use. Paragraph definition selector 520 may get a paragraph type 320 from the paragraph type set 332 of story flavor 330. Paragraph definition selector 520 may select a paragraph definition 322 for that paragraph type 320. Paragraph definition selector 520 may check history log 114 to determine how recently the selected paragraph definition 322 was used. If the selected paragraph definition 322 was not used within a threshold time period, e.g. one month, then the selected paragraph definition 322 may be used. Otherwise, that paragraph definition may be discarded and another selected.

In an embodiment, conditions within a paragraph definition 322 may be evaluated when a paragraph definition is selected to determine if additional paragraph definitions, or sentences, are to be appended to master template 522.

In various embodiments, logic flow 900 may load a paragraph template for the selected paragraph definition in block 910, for each paragraph type 320. For example, paragraph builder 530 may append a paragraph 400 to master template 522, including the static sentences 420, static text 436, data slots 432, and word slots 434 included in paragraph 400.

Blocks 908 and 910 may be repeated for each paragraph type 320 referenced in paragraph type set 332 for the selected story flavor 330. When a paragraph definition has been selected for each paragraph type, the loop beginning at block 906 ends at block 912.

In various embodiments, logic flow 900 may log paragraph templates used in block 914. For example, summary engine 112 may record in history log 114 what paragraph definitions 322 were used, and the date that they were used. Summary engine 112 may also note in history log 114, or directly in a database, what data was used to generate a narrative summary.

While the embodiments described herein refer primarily to fantasy games, embodiments may be extended to apply to other sources of content. For example, statistically driven content including financial news, such as stock market information, may be a source for content for narrative summaries. In an embodiment, templates 132 may be created for financial news reporting, and one or more beat writers 116 may be created to follow financial news. A beat writer 116 may be prompted to write a story when events such as large or sudden changes in a stock price occur, volume increases, and so forth. In such an embodiment, summary engine 110 may monitor such sources as stock ticker information, financial news websites, and so forth, which may be analogous to fantasy league system 120 as sources for new content for a narrative summary.

Other sources of content may include political content. Political content may include, for example and without limitation, political race data; legislative actions, such as votes; primary election results; general election results; debates; fund-raising information; endorsements; electoral college votes; and so forth. Templates 132 may be generated for political reporting, and beat writers 116 may be created to follow political news. A beat writer 116 may be prompted to write a story, for example, when fund raising amounts are disclosed by a campaign, election results are final, a piece of legislation is voted on, and so forth. A beat writer 116 for politics may have characteristics such as a political party bias. In such an embodiment, summary engine 110 may monitor such sources as news feeds, campaign websites, press releases, polling statistical data, and so forth, which may be analogous to fantasy league system 120 as sources for new content for a narrative summary. The embodiments are not limited to these examples.

Figure 10:
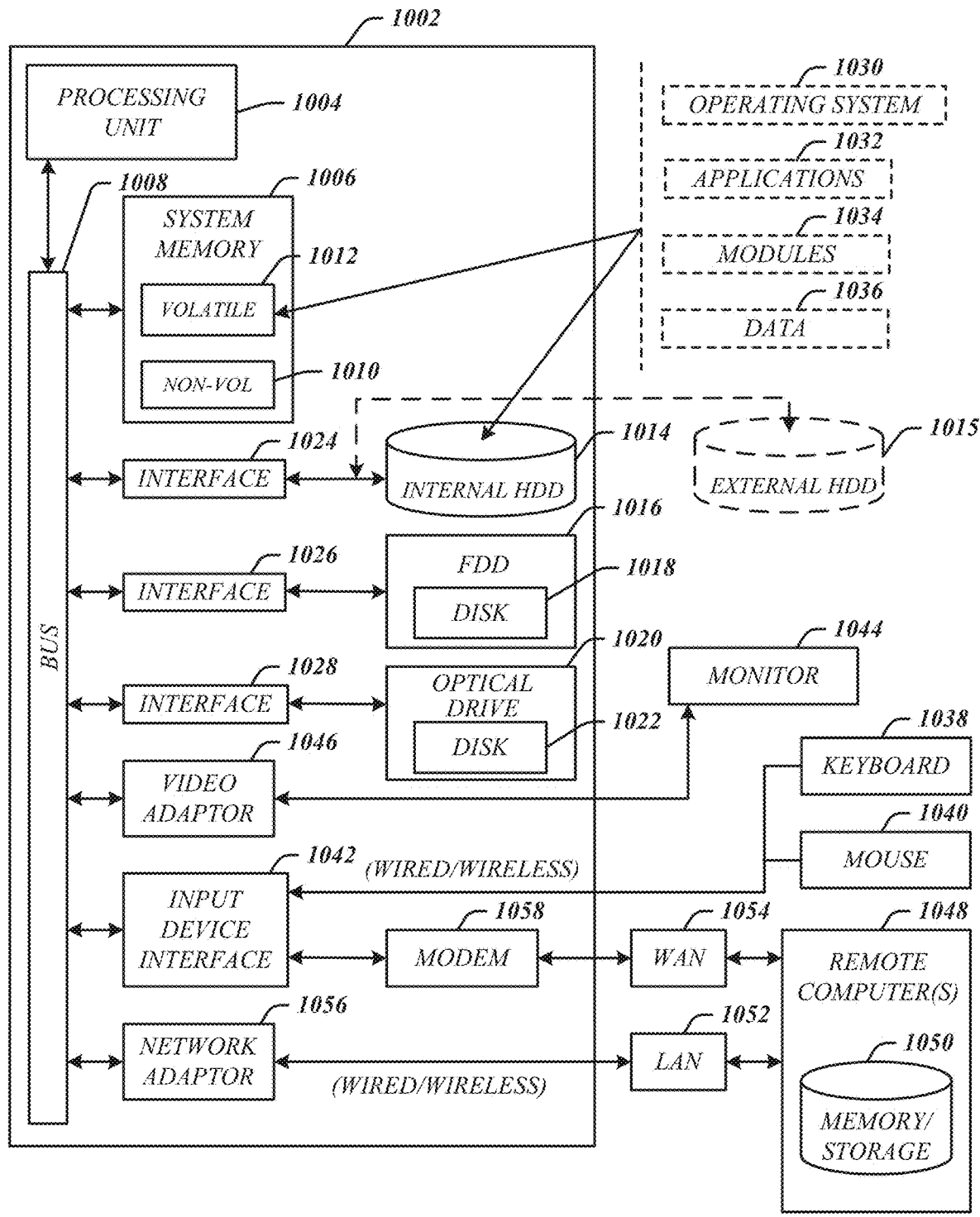
FIG. 10 illustrates a computing architecture in accordance with one or more embodiments.

FIG. 10 illustrates a computer architecture in accordance with one or more embodiments, suitable for implementing various embodiments as previously described. The computing architecture 1000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1000.

As shown in FIG. 10, the computing architecture 1000 comprises logic device(s) 1004, a system memory 1006 and a system bus 1008. Examples of a logic device may include, without limitation, processing circuitry, such as a central processing unit (CPU), microcontroller, microprocessor, general purpose processor, dedicated processor, chip multi-processor (CMP), media processor, digital signal processor (DSP), network processor, co-processor, input/output processor, application specific integrated circuit (ASIC), field programmable gate array (FPGA), programmable logic device (PLD), and so forth. Dual microprocessors and other multi-processor architectures may also be employed as the logic device(s) 1004. The system bus 1008 provides an interface for system components including, but not limited to, the system memory 1006 to the logic device(s) 1004. The system bus 1008 can be any of several types of bus structure that may further interconnect to a memory bus (with or without a memory controller), a peripheral bus, and a local bus using any of a variety of commercially available bus architectures.

The system memory 1006 may include computer-readable storage media including various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may additionally include various types of computer-readable storage media, including an internal hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. The one or more application programs 1032, other program modules 1034, and program data 1036 can include, for example, summary engine 112, 500.

A user can enter commands and information into the computer 1002 through one or more wire/wireless input devices, for example, a keyboard 1038 and a pointing device, such as a mouse 1040. Other input devices may include a microphone, an infra-red (IR) remote control, a joystick, a game pad, a stylus pen, touch screen, or the like. These and other input devices are often connected to the logic device(s) 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
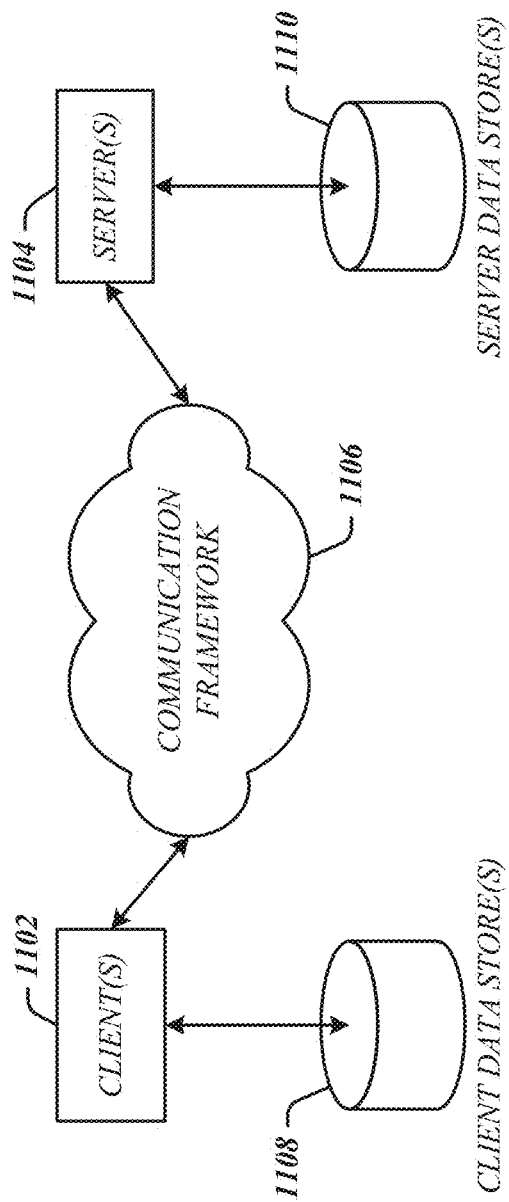
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 150. The servers 1104 may implement summary engine device 110, fantasy league system 120, and publication site 140. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1102 and the servers 1104 may include various types of standard communication elements designed to be interoperable with the communications framework 1106, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 1102 and a server 1104 can be in the form of a data packet adapted to be transmitted between two or more computer processes. The data packet may include a cookie and/or associated contextual information, for example.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

References to "one embodiment" or "an embodiment" mean that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer-implemented method comprising:
receiving a notification from a database of fantasy league data indicating the presence of new content comprising fantasy league data in the database, the database comprising settings for a beat writer for a fantasy league;
responsive to receiving the notification, receiving the new content from the database of fantasy league data;
selecting the beat writer for the fantasy league based on the settings of the beat writer and the new content, the settings of the beat writer including a personal trait setting, a style/personality setting, a content type setting, and a publication setting, the personal trait setting comprising: (i) a name of the beat writer, (ii) a face of the beat writer, (iii) a voice of the beat writer, (iv) an avatar of the beat writer, and (v) a title of the beat writer, the settings of the beat writer applied to all beat writers in the fantasy league;
selecting a narrative template that has not been used within a predefined time threshold and based on the new content and the selected beat writer, the narrative template comprising empty slots and a story type, the story type comprising one or more word categories comprising a container for one or more sets of word lists, each word category associated with a set of properties, each word list comprising a container for word definitions comprising one or more synonyms, each word definition bound to a data field comprising a range of values;
filling a first slot in the narrative template with a data item from the new content;
filling a conditional word slot of the narrative template with one of: (i) a word from a first word list of the one or more sets of word lists when a value of the data field to which the first word list is bound satisfies a first condition value of the narrative template associated with the conditional word slot, and (ii) a word from a second word list of the one or more sets of word lists when the value of the data field satisfies a second condition value of the narrative template associated with the conditional word slot;
tracking a frequency of activity and an amount of activity of a fantasy team owner associated with the new content, an activity comprising roster transactions for a fantasy team performed by the fantasy team owner using a fantasy league website for the fantasy league;
publishing the narrative template with the first slot and the conditional word slot filled when the frequency and the amount of activity of the fantasy team owner with the fantasy league website each meet a respective threshold specified in the publication setting of the beat writer, after a publication of a previous narrative template; and
logging the narrative template selected, a date that the narrative template was selected, and the new content published.

2. The method of claim 1, the new content comprising indications of: a real-world game associated with the new content, a type of the real-world game, a player of the real-world game associated with the fantasy team of the fantasy league and the new content, an injury to the player of the real-world game, an outcome of the real-world game associated with the new content, an outcome of a fantasy league event determined based on the real-world game and the new content, and an amount of the new content.

3. The method of claim 2, the story type further comprising: (i) a paragraph type comprising a container for a set of paragraph definitions describing a respective paragraph, and (ii) one or more story flavors, each story flavor comprising a respective paragraph type set, the paragraph type set comprising a list of references to one or more of the paragraph types, the beat writer comprising a first beat writer of a plurality of beat writers for the fantasy league, the first beat writer associated with the fantasy team owner, each remaining beat writer of the plurality of beat writers associated with a different fantasy team owner in the fantasy league, each of the plurality of beat writers associated with a respective settings, the method further comprising:
publishing the narrative template at irregular intervals, a frequency of the publishing at irregular intervals based on the tracked frequency of activity of the fantasy team owner;

generating a text-to-speech version comprising an audio stream of speech of the published narrative template; and publishing the text-to-speech version of the published narrative template.

4. The method of claim 3, wherein publishing comprises at least one of:
publishing to the fantasy league website;
publishing to an electronic mail message;
publishing to a social network;
publishing the text-to-speech version of the published narrative template to a radio feed stream;
publishing a video comprising the avatar speaking the text-to-speech version of the published narrative template;
publishing to a news ticker on at least one of: a website, a video, and a television program;
publishing a press release; and
publishing to a website external to the fantasy league website.

5. The method of claim 1, further comprising:
selecting the narrative template based on an attribute of the narrative template satisfying criteria of the beat writer; and
selecting a word list for filling the word slot according to the criteria of the beat writer.

6. The method of claim 1, further comprising:
scanning, for new content, each of:
a database of fantasy league team data;
a data set of recommended fantasy league transactions;
a database of fantasy league transaction data; and
a database of fantasy league breaking news.

7. An apparatus comprising:
a logic device comprising a processor circuit;
a first data store to store narrative templates comprising story types and story flavors, communicatively coupled to the logic device;
a second data store to store fantasy league data, communicatively coupled to the logic device, wherein a fantasy league comprises a plurality of fantasy teams, each fantasy team having an owner;
a memory storing instructions which when executed by the processor circuit cause the processor circuit to:
receive a notification from the second data store indicating the presence of new content comprising fantasy league data in the second data store, the first data store comprising settings for a beat writer for the fantasy league;
responsive to receiving the notification, receive the new content from the second data store;
select the beat writer for the fantasy league based on the settings of the beat writer and the new content, the settings of the beat writer including a personal trait setting, a style/personality setting, a content type setting, and a publication setting, the personal trait setting comprising: (i) a name of the beat writer, (ii) a face of the beat writer, (iii) a voice of the beat writer, (iv) an avatar of the beat writer, and (v) a title of the beat writer, the settings of the beat writer applied to all beat writers in the fantasy league;
select a narrative template that has not been used within a predefined time threshold and based on the settings of the beat writer and the new content;
select a story type based on the settings of the beat writer and the new content, the story type comprising one or more word categories comprising a container for one or more sets of word lists, each word category associated with a set of properties, each word list comprising a container for word definitions comprising one or more synonyms, each word definition bound to a data field comprising a range of values;
select a story flavor for the selected story type based on the settings of the beat writer, the story flavor having a plurality of paragraph types associated therewith;
select a paragraph definition for each of the plurality of paragraph types associated with the selected story flavor;
append the selected paragraph definitions together to construct a master template that has not been used within a predefined time threshold, the master template comprising empty slots; and
fill the empty slots of the master template with data from the new content to generate a narrative summary;
fill a conditional word slot of the narrative template with one of: (i) a word from a first word list of the one or more sets of word lists when a value of the data field to which the first word list is bound satisfies a first condition value of the narrative template associated with the conditional word slot, and (ii) a word from a second word list of the one or more sets of word lists when the value of the data field satisfies a second condition value of the narrative template associated with the conditional word slot;
track a frequency of activity and an amount of activity of a fantasy team owner associated with the new content, an activity comprising roster transactions for a fantasy team performed by the fantasy team owner using a fantasy league website for the fantasy league;
publish the narrative summary with the slots filled when the frequency and the amount of activity of the fantasy team owner with the fantasy league website each meet a respective threshold specified in the publication setting of the beat writer after a publication of a previous narrative summary; and
log the narrative template selected, a date that the narrative template was selected, and the new content published.

8. The apparatus of claim 7, the narrative summary published to at least one of:
a website;
a real simple syndication feed;
an e-mail message;
a news ticker;
a social network site;
a short messaging service message;
a multimedia messaging service message;
a text-to-speech telephone message;
an audio stream;
a video stream; and
a radio broadcast.

9. The apparatus of claim 8, the paragraph type comprising a container for a set of paragraph definitions describing a respective paragraph, each story flavor comprising a respective paragraph type set, the paragraph type set comprising a list of references to one or more of the paragraph types, the new content comprising indications of: a real-world game associated with the new content, a type of the real-world game, a player of the real-world game associated with the fantasy team of the fantasy league and the new content, an injury to the player of the real-world game, an outcome of the real-world game associated with the new content, an outcome of a fantasy league event determined based on the real-world game and the new content, and an amount of the new content, the filled narrative template published at irregular intervals, a frequency of the publishing at irregular intervals based on the tracked frequency of activity of the fantasy team owner, the memory storing instructions which when executed by the processor circuit cause the processor circuit to:
 generate a text-to-speech version comprising speech of the published narrative template; and
 publish the text-to-speech version of the published narrative template.

10. The apparatus of claim 9, wherein the beat writer comprising a first beat writer of a plurality of beat writers for the fantasy league, the first beat writer associated with the fantasy team owner, each remaining beat writer of the plurality of beat writers associated with a different fantasy team owner in the fantasy league, each of the plurality of beat writers associated with a respective settings, and wherein the second data store comprises: breaking news data, recommended fantasy transactions data, and fantasy transactions data.

11. A machine-readable storage medium comprising instructions that when executed cause a computing system to:
 receive a notification from a database of fantasy league data indicating the presence of new content comprising fantasy league data in the database, the database comprising settings for a beat writer for a fantasy league;
 responsive to receiving the notification, receive the new content from the database of fantasy league data, wherein a fantasy league comprises a plurality of fantasy teams, each fantasy team having an owner;
 select the beat writer for the fantasy league based on the settings of the beat writer and the new content, the settings of the beat writer including a personal trait setting, a style/personality setting, a content type setting, and a publication setting, the personal trait setting comprising: (i) a name of the beat writer, (ii) a face of the beat writer, (iii) a voice of the beat writer, (iv) an avatar of the beat writer, and (v) a title of the beat writer, the settings of the beat writer applied to all beat writers in the fantasy league;
 select a narrative template that has not been used within a predefined time threshold and based on the settings of the beat writer and the new content;
select a story type based on the settings of the beat writer and the new content, the story type comprising one or more word categories comprising a container for one or more sets of word lists, each word category associated with a set of properties, each word list comprising a container for word definitions comprising one or more synonyms, each word definition bound to a data field comprising a range of values;
 select a story flavor from a set of story flavors for the selected story type;
 select a paragraph definition randomly for each paragraph type of the selected story flavor;
 append the selected paragraph definitions together to construct a master template that has not been used within a predefined time threshold, the master template comprising empty slots;
 fill the empty slots of the master template with data from the new content to generate a narrative summary;
fill a conditional word slot of the narrative template with one of: (i) a word from a first word list of the one or more sets of word lists when a value of the data field to which the first word list is bound satisfies a first condition value of the narrative template associated with the conditional word slot, and (ii) a word from a second word list of the one or more sets of word lists when the value of the data field satisfies a second condition value of the narrative template associated with the conditional word slot;
 track a frequency of activity and an amount of activity of a fantasy team owner associated with the new content, an activity comprising roster transactions for a fantasy team performed by the fantasy team owner using a fantasy league website for the fantasy league; and
publish the narrative summary when the frequency and the amount of activity of the fantasy team owner with the fantasy league website each meet a respective threshold specified in the publication setting of the beat writer, after a publication of a previous narrative template; and
log the narrative template selected, a date that the narrative template was selected, and the new content published.

12. The storage medium of claim 11, further comprising instructions that when executed cause the computing system to:
 select a paragraph definition randomly for each paragraph type of the selected story flavor, when the paragraph definition has not been used within a threshold time period.

13. The storage medium of claim 12, the paragraph type comprising a container for a set of paragraph definitions describing a respective paragraph, each story flavor comprising a respective paragraph type set, the paragraph type set comprising a list of references to one or more of the paragraph types, the new content comprising indications of: a real-world game associated with the new content, a type of the real-world game, a player of the real-world game associated with the fantasy team of the fantasy league and the new content, an injury to the player of the real-world game, an outcome of the real-world game associated with the new content, an outcome of a fantasy league event determined based on the real-world game and the new content, and an amount of the new content, further comprising instructions that when executed cause the computing system to:
 log the paragraph definitions selected, a date that the paragraph definitions were selected, and the new content published;
 generate a text-to-speech version comprising speech of the published narrative template; and
 publish the text-to-speech version of the published narrative template.

14. The storage medium of claim 13, the beat writer comprising a first beat writer of a plurality of beat writers for the fantasy league, the first beat writer associated with the fantasy team owner, each remaining beat writer of the plurality of beat writers associated with a different fantasy team owner in the fantasy league, each of the plurality of beat writers associated with a respective settings, the storage medium further comprising instructions that when executed cause the computing system to:
 format the filled narrative summary for publishing to at least one of:
 the fantasy league website;
 an electronic mail message;
 a social network;
 a radio feed;
 a video comprising the avatar speaking the text-to-speech version of the published narrative summary;
 a news ticker on at least one of: a website, a video, and a television program;
 a press release; and
 a website external to a fantasy league website.

* * * * *